United States Patent [19]
Hewitt

[11] 3,814,991
[45] June 4, 1974

[54] INTERLOCK CIRCUIT

[75] Inventor: William Lloyd Hewitt, Harbor City, Calif.

[73] Assignee: Cam-Stat Incorporated, Los Angeles, Calif.

[22] Filed: Oct. 29, 1973

[21] Appl. No.: 410,386

[52] U.S. Cl.......... 317/141 S, 307/252 W, 307/293, 317/13 A, 317/36 TD
[51] Int. Cl. ............................................ H02h 7/085
[58] Field of Search............ 317/13 A, 13 B, 36 TD, 317/141 S; 307/252 W, 293

[56] References Cited
UNITED STATES PATENTS
3,619,668  11/1971  Pinckaers ...................... 317/36 TD
3,774,082  11/1973  Chang............................. 317/141 S Primary Examiner—J. D. Miller
Assistant Examiner—Harry E. Moose, Jr.
Attorney, Agent, or Firm—Harris, Kern, Wallen & Tinsley

[57] ABSTRACT

A circuit for controlling a load, such as the cooling compressor of an air conditioner, to prevent short cycling by utilizing a time delay or interlock after deenergizing a load, before the load can again be energized. An all solid state circuit operable on initial control switch closure to turn on power to the load and charge the capacitor of a time delay circuit, and operable on control switch opening to turn off power and maintain power off despite subsequent control switch closure until the capacitor has discharged through the delay circuit.

4 Claims, 1 Drawing Figure

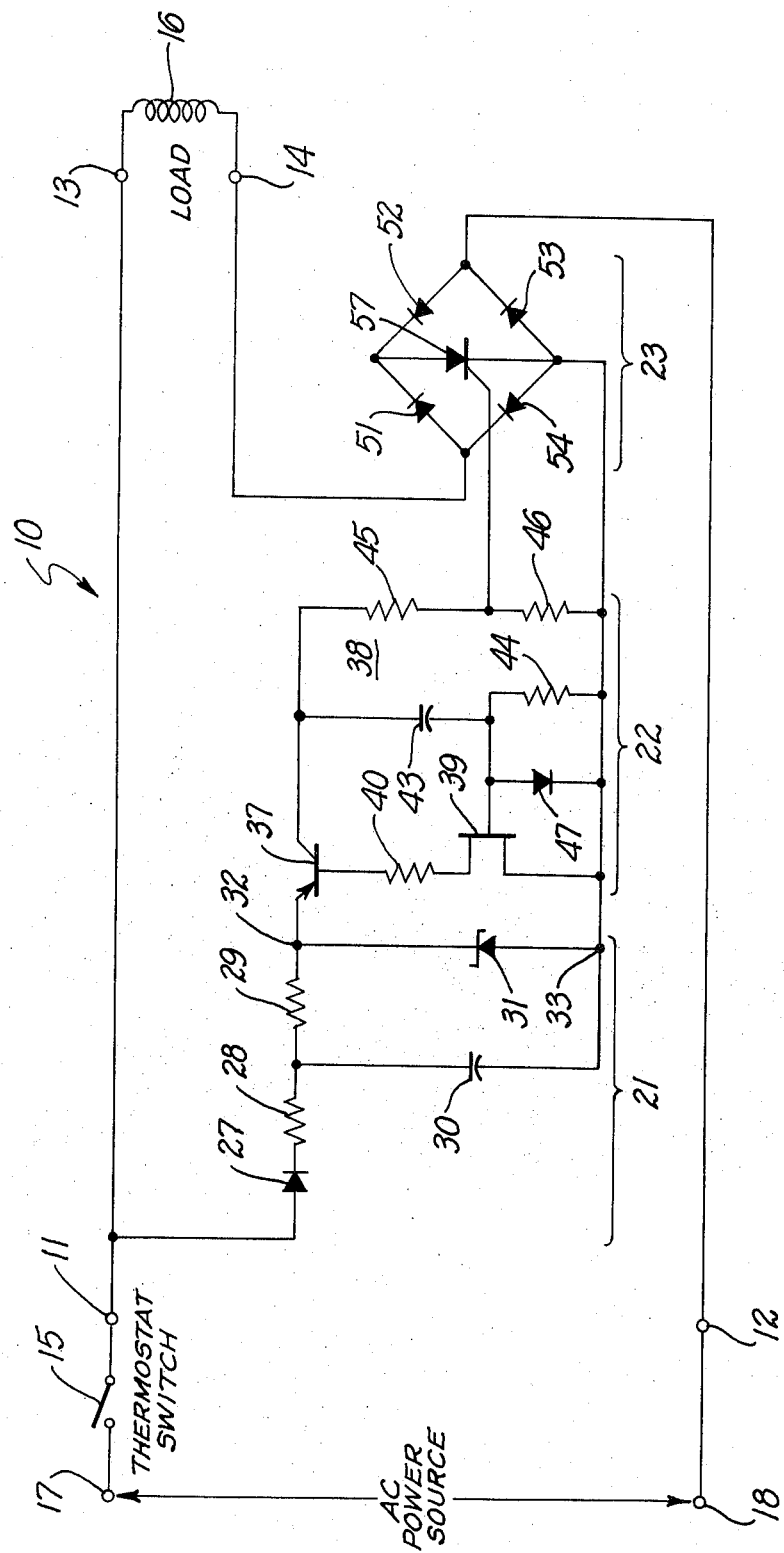

ial. INTERLOCK CIRCUIT

This invention relates to time delay circuits and in particular, to a new and improved time interlock or time delay circuit which provides a predetermined time interval after deenergization of a load before the load can again be energized. The time delay circuit is especially adapted for use in preventing short cycling of air conditioning compressors but is readily adapted for use in various other applications requiring interlock protection.

After an air conditioning compressor has been turned off, it is desirable that the control system prevent turning on of the compressor for a period of time, typically three to five minutes, in order to prevent damage and excessive wear. Some cooling systems have a tendency for a variety of reasons to turn on and turn off at relatively short intervals and this undesirable phenomenon is usually referred to as short cycling. Time delays or interlocks are incorporated in cooling systems to prevent the short cycling mode of operation.

A variety of devices have been utilized in the past for the time delay control. One form of prior art device utilizes a conventional motor driven timer to provide the desired delay. Another type of prior art device utilizes the charging of a capacitor through a resistor, with the magnitude of the delay being a function of the time constant of the RC circuit. One such prior art circuit is described in Appliance Engineer, Volume 5, No. 5., 1971, p. 24. Another prior art resistance-capacitance device is shown in U.S. application for patent, Ser. No. 298,463, filed Oct. 18, 1972, now U.S. Pat. No. 3,774,082.

The resistance-capacitance devices do away with the need for a motor driven timer, but have certain other disadvantages. Interlock devices of the type shown in Appliance Engineer are relatively complex and require the electric power source to be on at all times, and further are not readily insalled by simple interconnections between the thermostat switch and the compressor relay. The device disclosed in the copending application Ser. No. 298,463 utilizes a simpler circuit but also utilizes a mechanical relay for switching the load on and off and for switching the time delay capacitor.

Accordingly, it is an object of the present invention to provide a new and improved interlock circuit incorporating a time delay for preventing short cycling and the like. A further object is to provide such a circuit which can be installed directly between a control switch and a load, such as a thermostat switch and a compressor relay, and one which incorporates a solid state switch for power switching and which does not require any switching of the storage capacitor.

Other objects, advantages, features and results will more fully appear in the following description. The single FIGURE of the drawing is an electrical schematic of the presently preferred embodiment of the invention and is given by way of illustration or example.

In the FIGURE of the drawing, an interlock circuit 10 with line terminals 11, 12 and load terminals 13, 14 is connected between a control switch, such as a thermostat switch 15, and a load, such as a cooling compressor relay 16. The circuit typically may be energized from an ac power source connected at terminals 17, 18, and includes a dc supply section 21, a time delay section 22 and a solid state switching section 23.

The dc power supply section 21 typically includes a diode 27 operated as a half wave rectifier, with resistors 28, 29 and capacitor 30 connected as a filter. A zener diode 31 may be connected across the dc supply output at points 32, 33 to serve as a voltage regulator.

In the time delay section 22, the emitter and collector electrodes of a transistor 37 are connected in series with a resistance-capacitance circuit 38 across the dc supply terminals 32, 33. Another transistor 39, preferably a field effect transistor, is connected in a series with a resistor 40 between the base of the transistor 37 and terminal 33. In the network 38, series connected capacitor 43 and resistor 44 are connected in parallel with series connected resistor 45 and resistor 46, with the junction of capacitor 43 and resistor 44 connected to the base of transistor 39 and connected to the terminal 33 via diode 47.

In the switching circuit 23, four diodes 51-54 are connected as illustrated with one point connected to the input terminals 18, 12 and with the opposite point connected to the output terminal 14, and with a controlled rectifier 57 connected across the other points. The junction point of the resistors 45, 46 is connected to the control electrode of the rectifier 57.

In operation, when the control switch 15 is closed the transistor 39 is normally on or conducting and therefore the transistor 37 conducts charging the capacitor 43 through the resistor 44 and also providing gate current to the controlled rectifier 57 turning the switching circuit on. With one-half cycle of the ac power source, there is conduction from the terminal 17 through the switch 15 and load 16 and through the diode 51, rectifier 57 and diode 53 to the terminal 18. In the next half cycle, there is conduction from the terminal 18 through the diode 52, rectifier 57 and diode 54, and through the load 16 and switch 15 to terminal 17. With the switching circuit, the load is energized with full wave ac from the power source connected at terminals 17, 18.

When the switch 15 is opened, the gate of transistor 39 is driven negative by the charge on the capacitor 43 cutting off transistor 39 and transistor 37. The capacitor 43 discharges through the resistors 45, 46, 44, and the controlled rectifier is also turned off.

If the switch 15 is again closed before the capacitor 43 has discharged, the gate of the transistor 39 will be negative holding the transistor in the off condition and thereby holding the transistor 37 in the off condition. Hence the switching circuit 23 cannot be turned on by closing the switch 15 until a predetermined time has passed since the opening of the switch 15, with this predetermined time being controlled by the time constant of the network 38. After the capacitor 43 is discharged, the interlock circuit again will permit energizing of the load 16 by closing of the switch 15. If the switch 15 has already been closed, the switching circuit 23 will be turned on when the gate voltage of the transistor 39 rises to the turn on value.

In the circuit of the FIGURE, the capacitor 43 is charged through the transistor 37, independent of the switching circuit 23. Preferably, the circuit parameters are selected so that the charge rate of the capacitor is greater than the discharge rate thereby insuring that the capacitor is always charged fully except when transistor 37 is nonconducting. The time delays in the range of 1 to 10 minutes normally desired for compressor interlock circuits are readily obtained with the circuit of the present invention. Both charging and discharging of the capacitor are independent of the operation of the switching circuit 23.

I claim:

1. In an interlock circuit for energizing a load from a power source by a control switch not less than a predetermined time after de-enerization of the load the combination of:
    a solid state switch having a control gate for switching to the conducting condition;
    means for connecting said solid state switch in circuit between the power source and the load;
    a dc power supply having first and second output terminals;
    a storage capacitor;
    a first transistor having its collector and emitter electrodes connected in series with said capacitor across said output terminals for charging said capacitor;
    a resistor circuit connected across said capacitor;
    first circuit means connecting a point on said resistor circuit to said control gate;
    a second transistor having its collector and emitter electrodes connected between the base of said first transistor and one of said output terminals for controlling current in said first transistor; and
    second circuit means connecting said capacitor to the base of said second transistor for controlling current in said second transistor;
    with said first transistor conducting, charging said capacitor and developing a control voltage at said point of said resistor circuit, switching said solid state switch to the conducting condition when the control switch is closed and said capacitor is not charged,
    with said capacitor discharging into said resistor circuit and blocking current in said second transistor and in said first transistor when the control switch is opened, switching said solid state switch to the nonconducting condition and preventing conduction by said first transistor until said capacitor is discharged below a predetermined value.

2. An interlock circuit as defined in claim 1 wherein the rate of discharge of said capacitor through said resistor circuit is less than the rate of charge through said first transistor for maintaining said capacitor charged except when said first transistor is not conducting.

3. An interlock circuit as defined in claim 2 wherein said second transistor is a normally conducting field effect transistor.

4. An interlock circuit as defined in claim 3 wherein said solid state switch includes four diodes connected in a full wave configuration with two opposite points for connection to the power source and load, and a controlled rectifier connected across the other two opposite points.

* * * * *